(12) United States Patent
Ryckman

(10) Patent No.: US 8,468,740 B1
(45) Date of Patent: Jun. 25, 2013

(54) ADJUSTABLE FISHING TACKLE BOX SYSTEM

(75) Inventor: Mark T. Ryckman, Pollock, SD (US)

(73) Assignee: Crank Caddy, Inc., Pollock, SD (US)

( * ) Notice: Subject to any disclaimer, the term of this patent is extended or adjusted under 35 U.S.C. 154(b) by 345 days.

(21) Appl. No.: 12/772,443

(22) Filed: May 3, 2010

Related U.S. Application Data

(63) Continuation-in-part of application No. 11/839,087, filed on Aug. 15, 2007, now abandoned.

(51) Int. Cl.
*A01K 97/06* (2006.01)

(52) U.S. Cl.
USPC .................. 43/57.1; 43/54.1; 206/315.11

(58) Field of Classification Search
USPC ...... 43/54.1, 57.1, 57.2; 206/315.11; 224/920
IPC ...................................................... A01K 97/06
See application file for complete search history.

(56) References Cited

U.S. PATENT DOCUMENTS

| | | | | |
|---|---|---|---|---|
| 2,125,856 A | * | 8/1938 | De Witt | 220/532 |
| 2,144,300 A | | 1/1939 | Stryker, Jr. | |
| 2,364,807 A | * | 12/1944 | Nelson, Jr. | 43/57.1 |
| 2,595,051 A | * | 4/1952 | Bryant | 43/57.1 |
| 2,723,484 A | * | 11/1955 | Nelson, Jr. | 43/54.1 |
| 2,749,654 A | | 6/1956 | Harris | |
| 4,006,553 A | * | 2/1977 | Porter et al. | 43/54.1 |
| 4,023,304 A | * | 5/1977 | Singer | 43/54.1 |
| 4,198,777 A | * | 4/1980 | Cruzan et al. | 43/57.1 |
| 4,577,433 A | | 3/1986 | Jones | |
| 4,924,621 A | | 5/1990 | Hawranik et al. | |
| 5,018,298 A | | 5/1991 | Spears | |
| 5,042,193 A | * | 8/1991 | Steiner | 43/54.1 |
| 5,157,862 A | | 10/1992 | Companiony | |
| 5,228,232 A | * | 7/1993 | Miles | 43/57.1 |
| 5,269,090 A | | 12/1993 | Richards et al. | |
| 5,386,662 A | | 2/1995 | Vader et al. | |
| 5,392,557 A | * | 2/1995 | Harmon et al. | 43/57.1 |
| 5,606,820 A | * | 3/1997 | Suddeth | 43/57.1 |
| 5,915,553 A | * | 6/1999 | Brown et al. | 206/372 |
| 5,941,017 A | * | 8/1999 | Junck et al. | 43/57.2 |
| 6,079,148 A | | 6/2000 | Yonenoi | |
| 6,101,760 A | | 8/2000 | Garman | |
| 6,959,811 B1 | * | 11/2005 | Hoover | 206/315.11 |
| 7,299,584 B2 | * | 11/2007 | Hoover | 43/54.1 |
| 7,552,560 B2 | * | 6/2009 | Hoover | 43/57.1 |
| 2004/0074136 A1 | | 4/2004 | Moss | |
| 2004/0194366 A1 | | 10/2004 | Westcott | |
| 2005/0051444 A1 | * | 3/2005 | Hurt et al. | 206/315.11 |

(Continued)

*Primary Examiner* — Darren W Ark
*Assistant Examiner* — Thien Thanh Pham
(74) *Attorney, Agent, or Firm* — Neustel Law Offices

(57) ABSTRACT

The fishing tackle box includes a container, a plurality of first guide slots spaced along a first sidewall of the container, a plurality of second guide slots spaced along a second sidewall of the container, and at least one lure holder having an angular panel including a plurality of spaced apart slots for receiving at least one fishing lure with a hook of the fishing lure positioned below the panel and a body of the fishing lure positioned above said panel. At least one first protrusion extends laterally outward from a first sidewall of said lure holder and at least one second protrusion extends laterally outward from a second sidewall of said lure holder to be collectively received by at least one first guide slot and at least one second guide slot. The lure holder may be comprised of different sizes to hold different sizes or numbers of fishing lures.

18 Claims, 13 Drawing Sheets

U.S. PATENT DOCUMENTS

| | | |
|---|---|---|
| 2006/0042152 A1* | 3/2006 | Pearson .................. 43/54.1 |
| 2007/0011939 A1 | 1/2007 | Sakai |
| 2007/0234636 A1* | 10/2007 | Schwartz .................. 43/54.1 |
| 2009/0119974 A1 | 5/2009 | Rieux |

* cited by examiner

ADJUSTABLE FISHING TACKLE BOX SYSTEM

CROSS REFERENCE TO RELATED APPLICATIONS

I hereby claim benefit under Title 35, United States Code, Section 120 of U.S. patent application Ser. No. 11/839,087 filed Aug. 15, 2007. This application is a continuation in-part of the Ser. No. 11/839,087 application now abandoned. The Ser. No. 11/839,087 application is currently pending. The Ser. No. 11/839,087 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fishing tackle boxes and more specifically it relates to an adjustable fishing tackle box system for efficiently securing various fishing lures.

2. Description of the Related Art

Any discussion of the related art throughout the specification should in no way be considered as an admission that such related art is widely known or forms part of common general knowledge in the field.

Fishing tackle boxes have been in use for years. Typically, fishing tackle boxes are utilized by fisherman to hold the currently non-utilized fishing lures while fishing and during storage. Fishing tackle boxes are manufactured in various sizes and are generally adapted to hold various types of fishing lures. A common method utilized to secure lures within various prior fishing tackle boxes is to utilize various small trays or compartments, wherein the lure(s) is positioned within a respective tray.

Positioning lures within the trays can lead to various problems, such as but not limited to multiple lures becoming tangled within the tray thus increasing the time it takes to efficiently remove the untangled lure from the fishing tackle box. Another common problem associated with prior fishing tackle boxes is the tips of lures becoming dull by engaging other lures or elements within the tray.

In addition, another disadvantage with prior fishing tackle boxes is that the boxes are generally manufactured to secure a certain amount of lures, thus forcing the fisherman to at times utilize a larger than necessary fishing tackle box or a fishing tackle box that is too small. Because of the general lack of efficiency and practicality in the prior art there is the need for a new and improved adjustable fishing tackle box system for efficiently securing various fishing lures.

BRIEF SUMMARY OF THE INVENTION

A system for providing an adjustable fishing tackle box to efficiently secure fishing lures. The invention generally relates to a fishing tackle box which includes a container, a plurality of first guide slots spaced along a first sidewall of the container, a plurality of second guide slots spaced along a second sidewall of the container, and at least one lure holder having an angular panel including a plurality of spaced apart slots for receiving at least one fishing lure with a hook of the fishing lure positioned below the panel and a body of the fishing lure positioned above said panel. At least one first protrusion extends laterally outward from a first sidewall of said lure holder and at least one second protrusion extends laterally outward from a second sidewall of said lure holder to be collectively received by at least one first guide slot and at least one second guide slot. The lure holder may be comprised of different sizes to hold different sizes or numbers of fishing lures.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
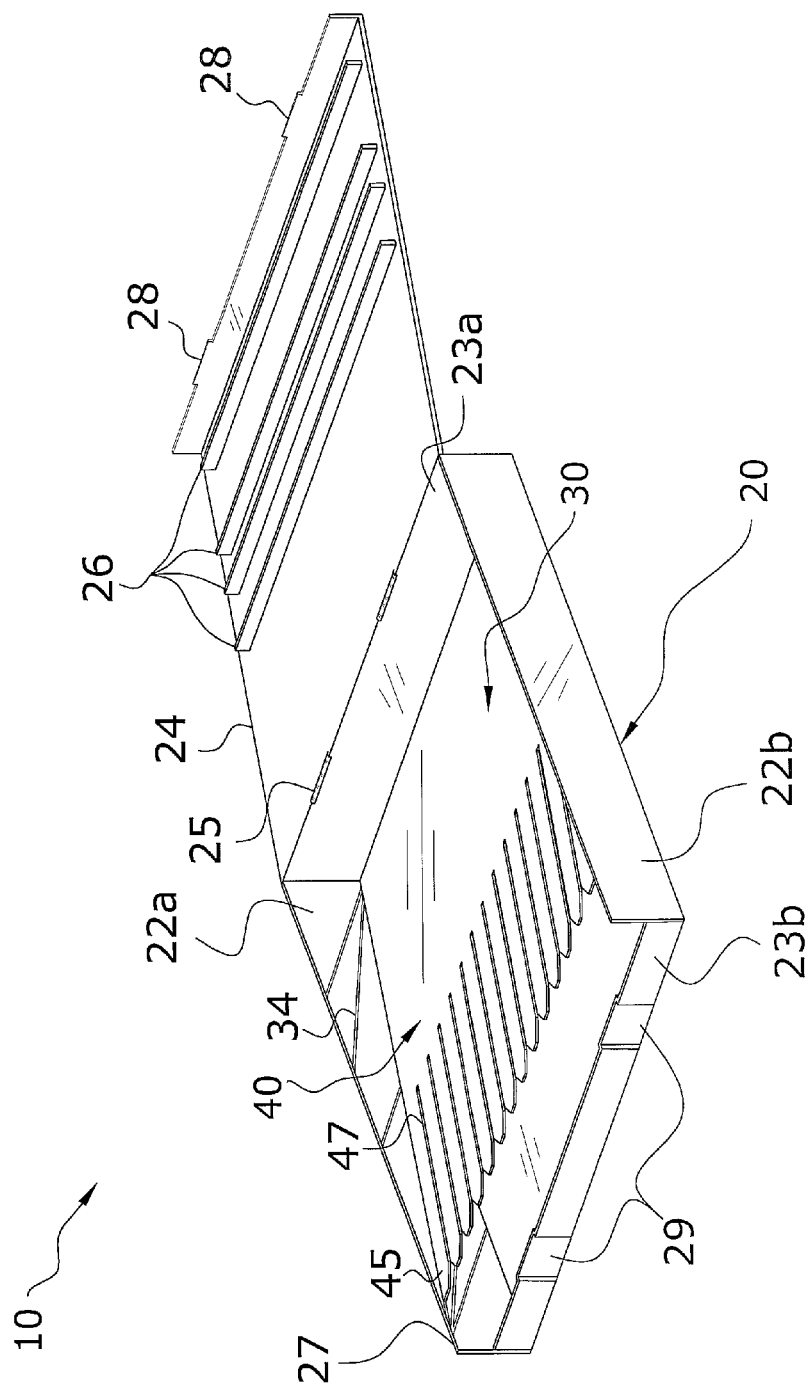
FIG. 1 is an upper perspective view of the present invention with the lid opened.

Turning now descriptively to the drawings, in which similar reference characters denote similar elements throughout the several views, FIGS. 1 through 13 illustrate an adjustable fishing tackle box system 10, which comprises a container 20, a plurality of first guide slots 39a spaced along a first sidewall 22a of the container 20, a plurality of second guide slots 39b spaced along a second sidewall 22b of the container 20, and at least one lure holder 50 having an angular panel 55 including a plurality of spaced apart slots 59 for receiving at least one fishing lure 12 with a hook 14 of the fishing lure 12 positioned below the panel 55 and a body 13 of the fishing lure 12 positioned above said panel 55.

At least one first protrusion 52a extends laterally outward from a first sidewall 51a of said lure holder 50 and at least one second protrusion 52b extends laterally outward from a second sidewall 51b of said lure holder 50 to be collectively received by at least one first guide slot 39a and at least one second guide slot 39b. The lure holder 50 may be comprised of different sizes to hold different sizes or numbers of fishing lures 12.

Figure 3:
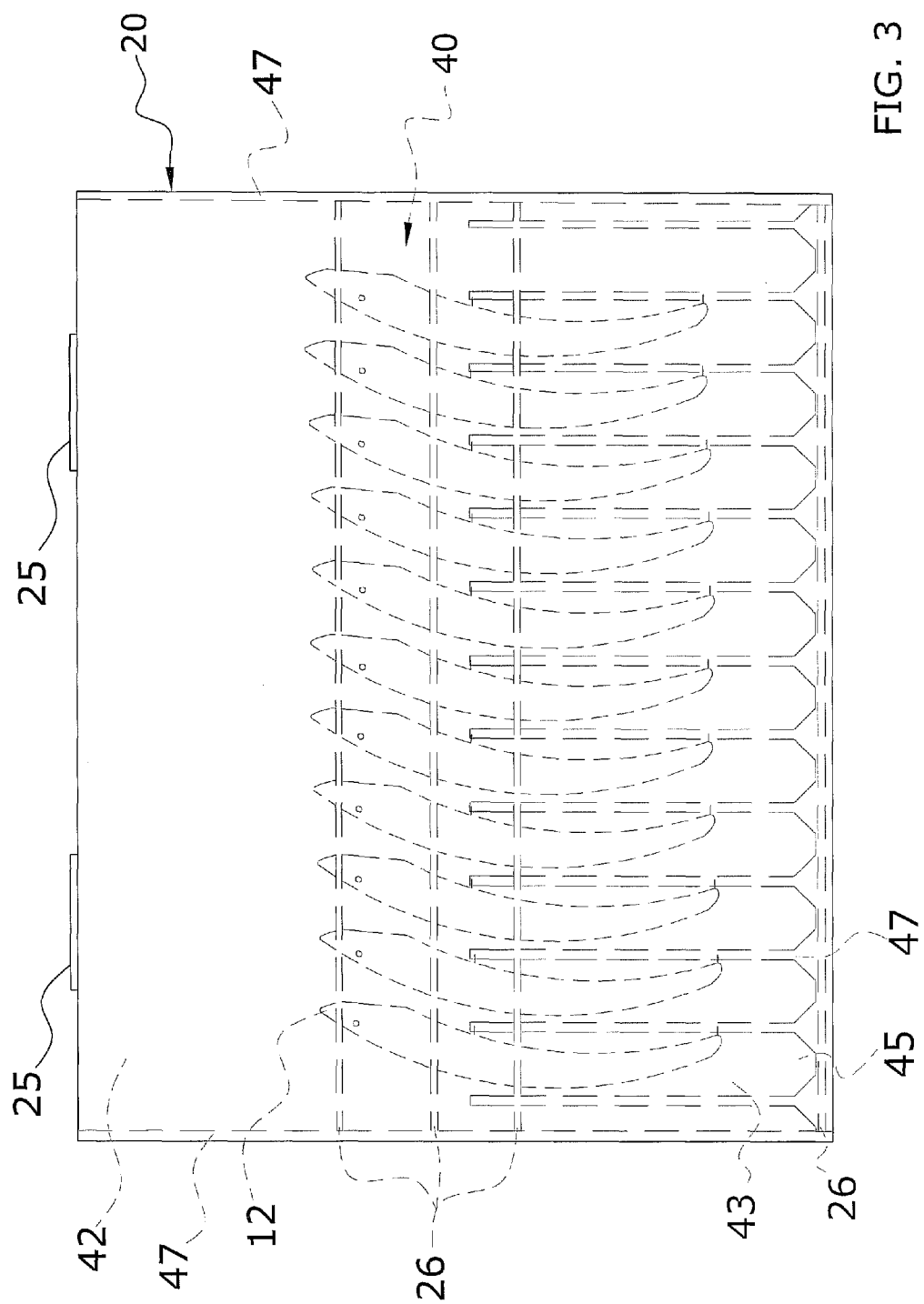
FIG. 3 is a top view of the present invention illustrating a plurality of fishing lures secured to the panel.
Figure 4:
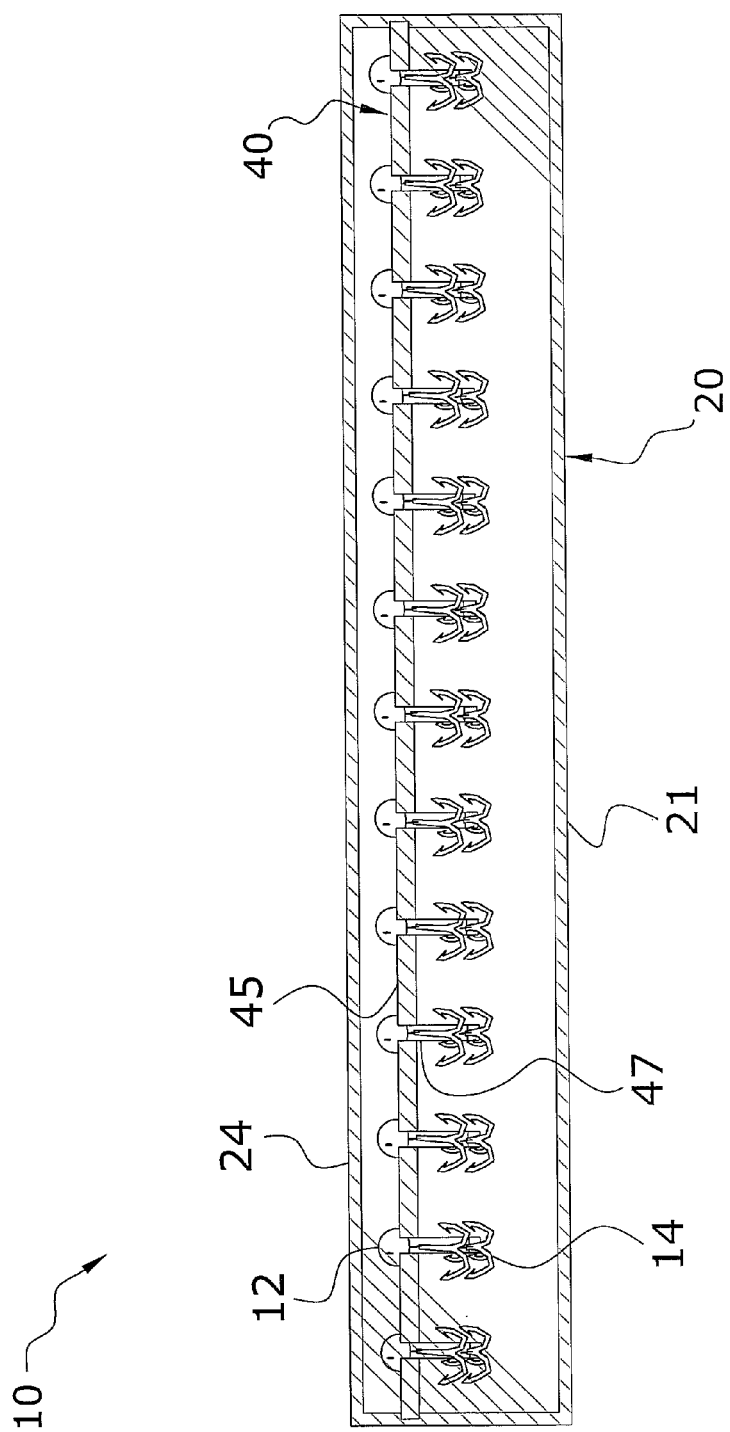
FIG. 4 is a front cross-sectional view of the present invention illustrating a plurality of fishing lures secured to the panel.
Figure 6:
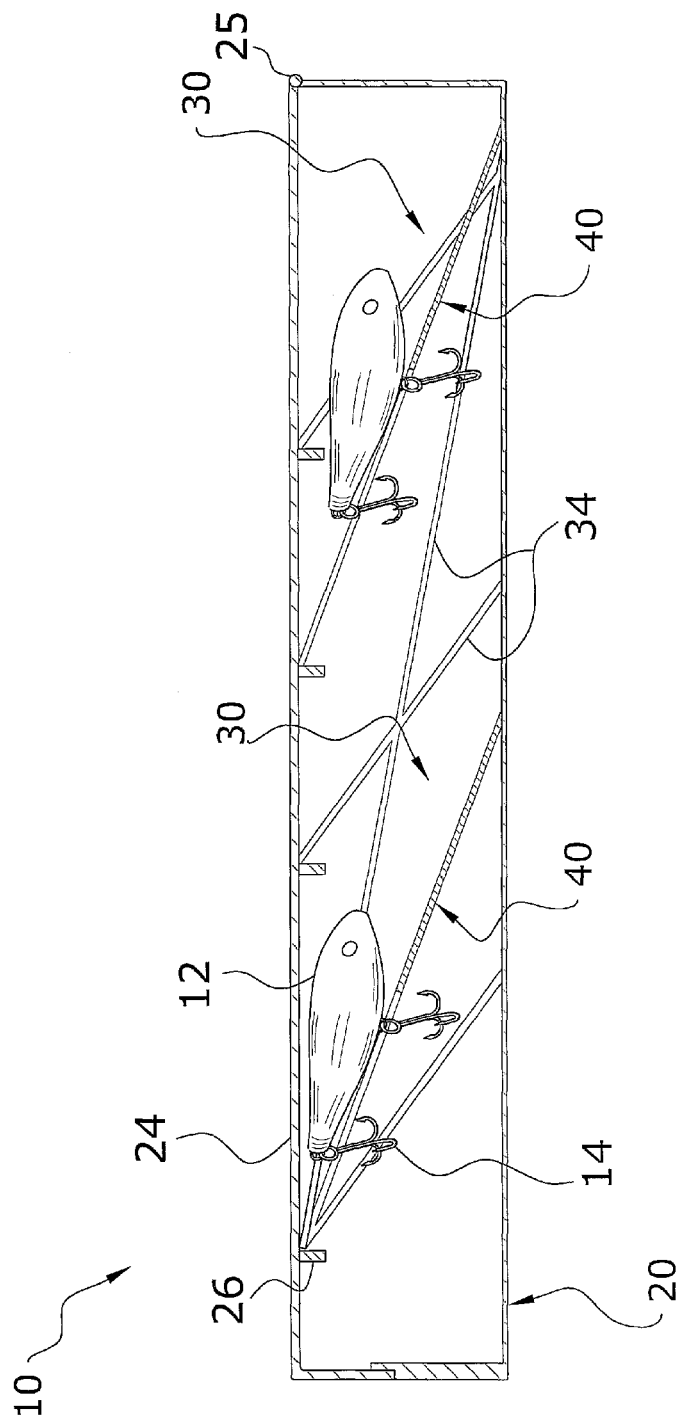
FIG. 6 is a side cross-sectional view of the present invention utilizing a plurality of small sized panels to accommodate smaller size fishing lures.

The slots 59 of the panel 55 each removably receive a fishing lure 12, wherein the connecting apparatus between the hook 14 and the body 13 of the fishing lure 12 is slid within a respective slot 55 as illustrated in FIGS. 3, 4 and 6. The present invention may be utilized to secure various types of fishing lures 12, such as but not limited to wobblers, surface lures, spoon lures, plugs, fly lures, Texas Rigs, Mormyshka, Trout worms, Bass worms, Spinnerbait, Crankbaits, Swimbaits, Jerkbaits, Carolina Rigs and various others.

B. Container

The container 20 is preferably comprised of a compact configuration, wherein multiple containers 20 may be simultaneously carried within a carrying case. The multiple containers 20 may be utilized to hold numerous amounts of a particular type of fishing lure 12, each container 20 hold a different type of fishing lure 12 or various other configurations.

The container 20 is also preferably comprised of a durable and waterproof material, such as but not limited to plastic, wood or metal. The container 20 is further preferably comprised of a rigid structure so as to not bend upon the enclosed fishing lures 12. In the preferred embodiment, the container 20 is comprised of a rectangular shaped structure; however it is appreciated that the container 20 may be comprised of various shapes and configurations rather than the preferred embodiment.

Figure 2:
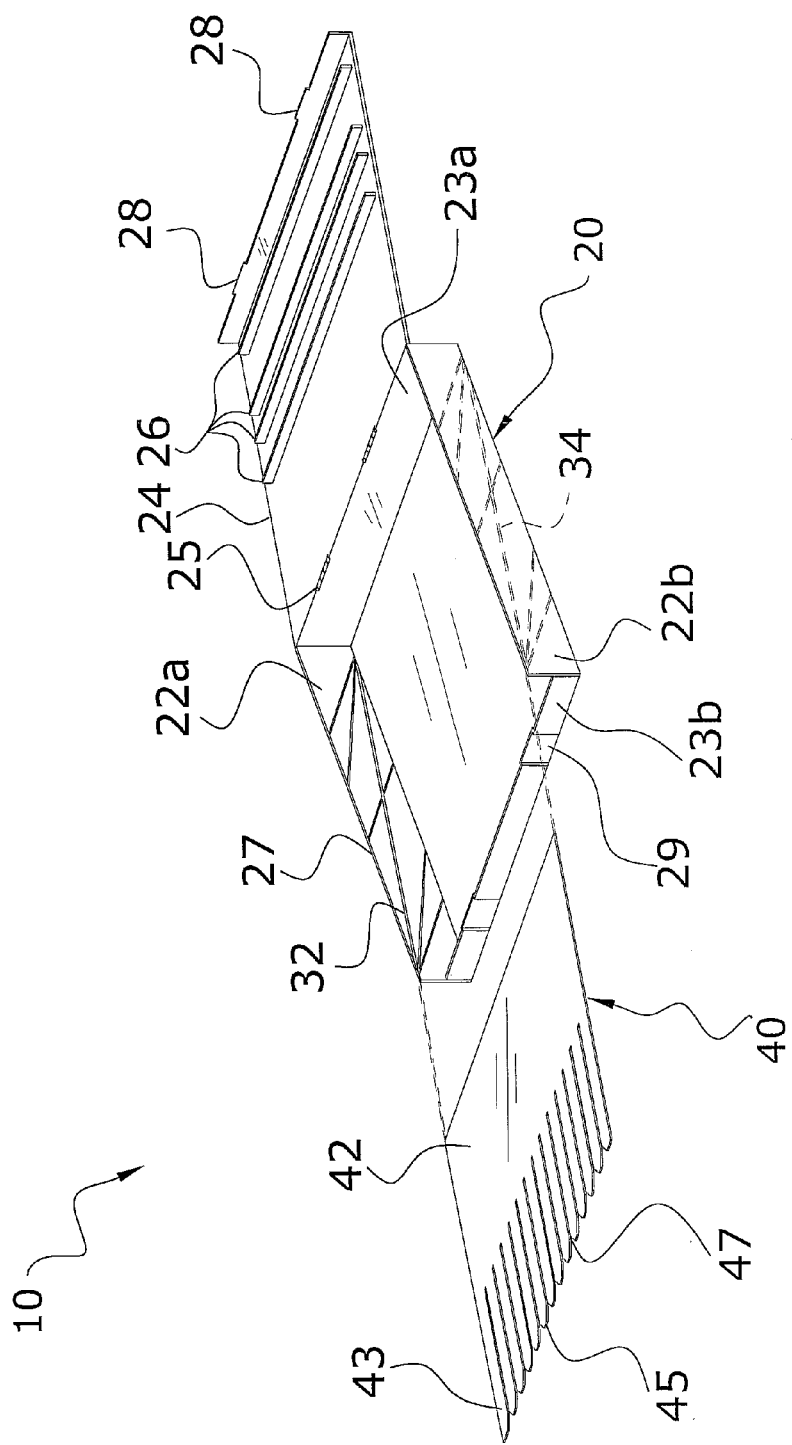
FIG. 2 is an upper perspective view of the present invention with the lid opened and the panel exploded outwards.

The container 20 includes a base 21, a pair of sidewalls 22a, 22b extending upward from the base 21 and upon opposing sides of the base 21. The container 20 also includes a pair of end walls 23a, 23b extending upward from opposing ends of the base 21 and between the sidewalls 22a, 22b as illustrated in FIGS. 1 through 3. The container 20 also includes a lid 24 to selectively seal an opening 27 extending within the container 20 between the sidewalls 22a, 22b and end walls 23a, 23b.

The lid 24 is preferably pivotally attached to the container 20 via a plurality of hinges 25. In the preferred embodiment the lid 24 is pivotally attached to the end wall 23a. It is appreciated however that the lid 24 may selectively cover and uncover the opening 27 in various manners rather than the preferred embodiment, such as but not limited to slidably attaching upon the container 20 and over the opening 27 or removably attaching upon the container 20 and over the opening 27.

Figure 7:
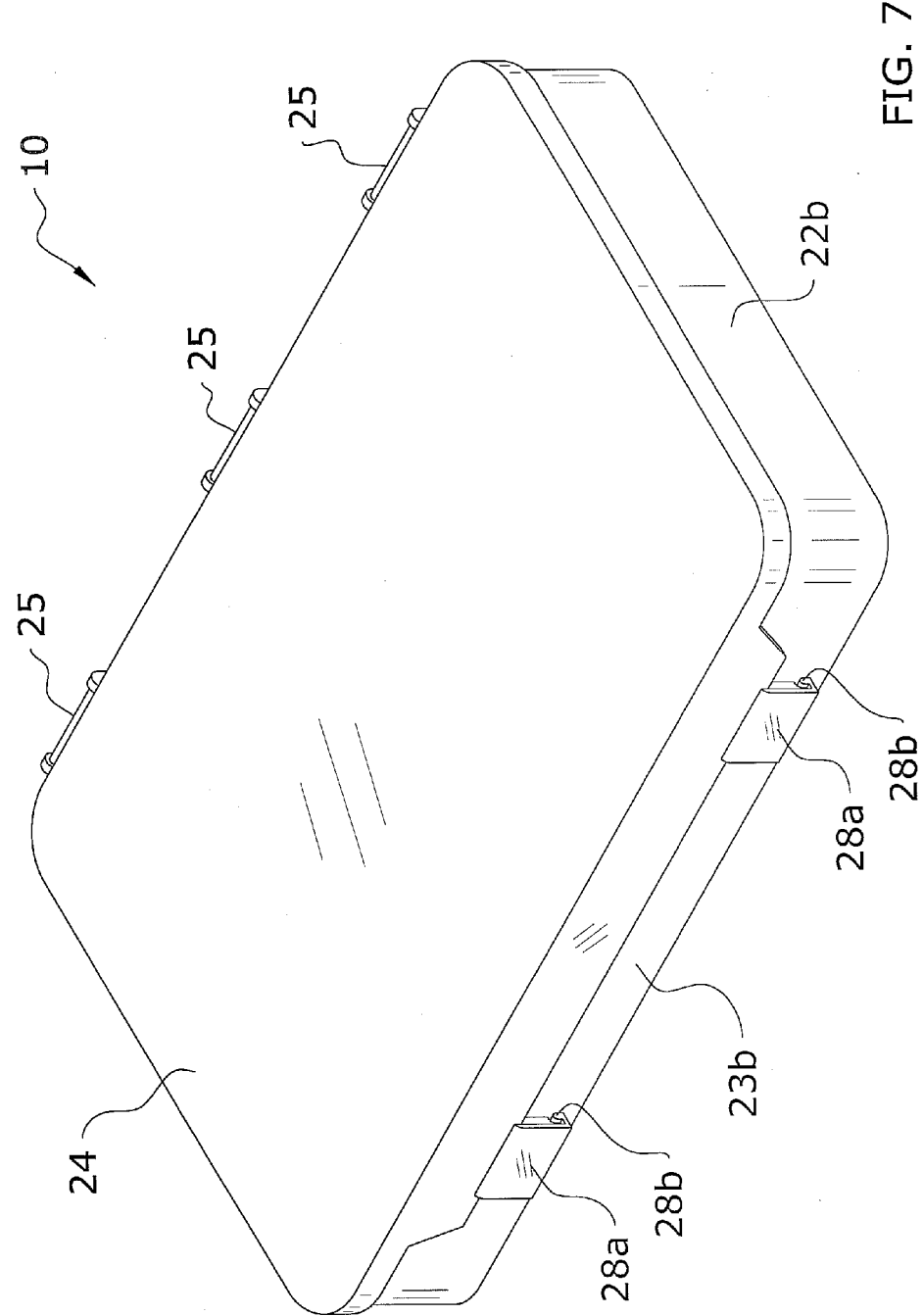
FIG. 7 is an upper perspective view of the improved present invention.
Figure 8:
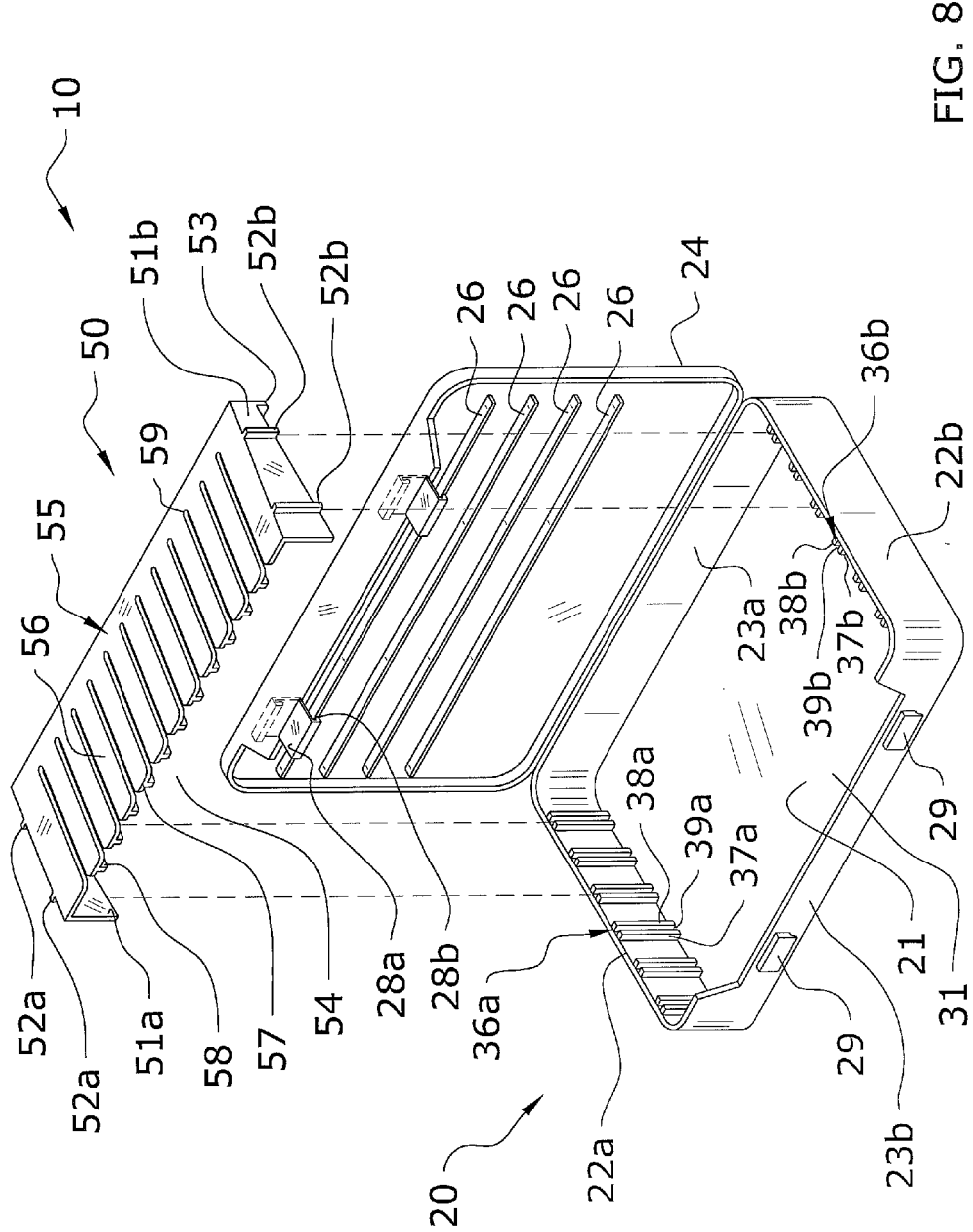
FIG. 8 is an upper perspective view of the improved present invention illustrating the lid in an open position and the lure holder exploded from the container.

The lid 24 also includes at least one first connecting portion 28 (opposite the hinge 25) to secure the lid 24 over the opening 27. The first connecting portion 28 secures to a second connecting portion 29 of the end wall 23b (opposite the hinge 25). The first connecting portion 28 and the second connecting portion 29 may be comprised of various latching mechanisms common in the art of carrying cases, fishing tackle boxes and various other containers all which effectively secure the lid 24 over the opening 27. As illustrated in FIGS. 7 and 8, the first connecting portion may include a pivotal portion 28a and a hook portion 28b for engaging and being secured to the bottom of the second connecting portion 29. The end wall 23b may also be recessed to receive a front lip of the lid 24 thus allowing less restriction for a user reaching into the cavity 31 of the container 20 due to a shorter end wall 23b.

Figure 5:
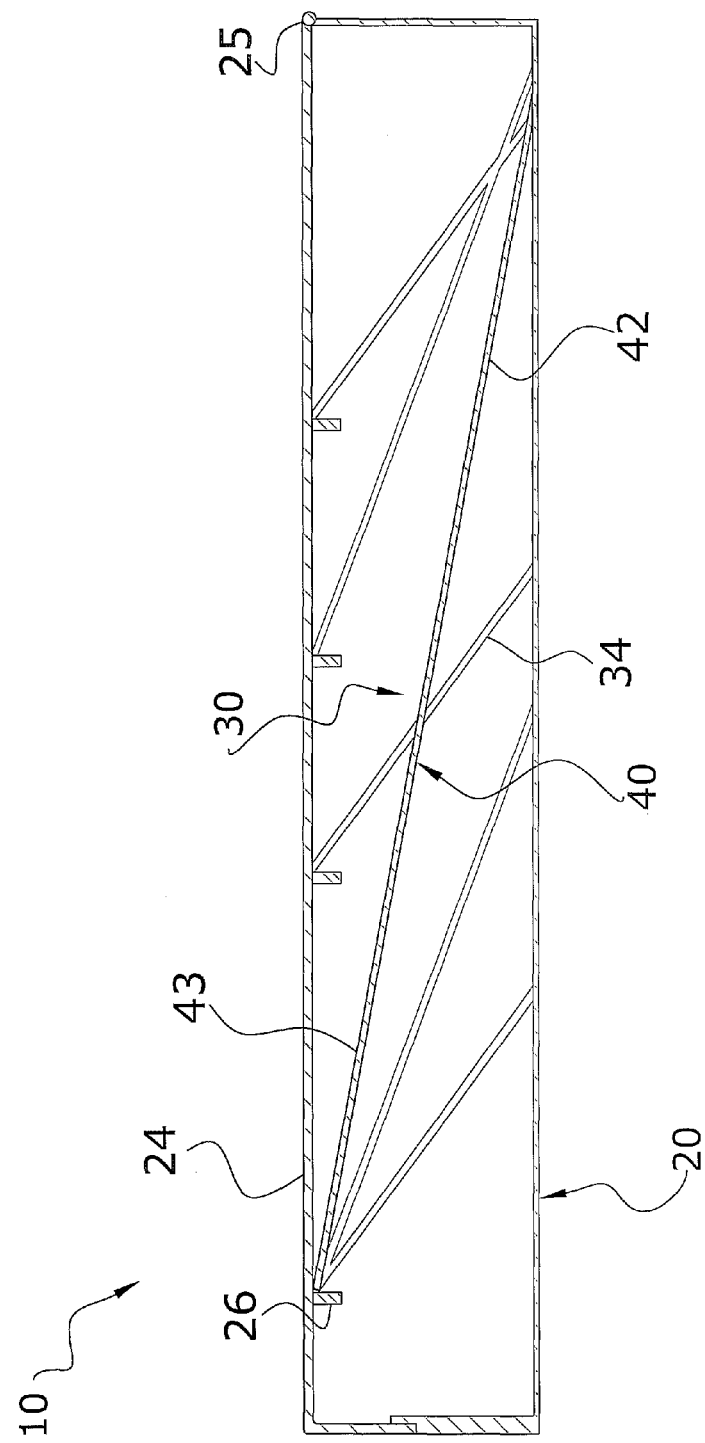
FIG. 5 is a side cross-sectional view of the present invention.

The container 20 also includes a plurality of stopper members 26 extending perpendicularly downward from the lid 24 as illustrated in FIGS. 5, 6, and 8-13. The stopper members 26 are preferably comprised of elongated members extending across the lid 24 from side to side. When the lid 24 is closed over the opening 27, the stopper members 26 preferably extend over a front of a receiving edge 45 and the slots 47 of the panel 40 as illustrated in FIGS. 5 and 6. The stopper members 26 subsequently prevent the fishing lure 12 from sliding out of the slot 47 and off the panel 40.

It is appreciated that the present invention includes a plurality of stopper members 26 to accommodate the various number and configuration of panels 40 that may be positioned within the container 20 as illustrated in FIGS. 5 and 6. The stopper members 26 also preferably do not extend down a sufficient distance to prevent the currently non-utilized stopper members 26 from interfering with or engaging the fishing lures 12. The stopper members 26 are also preferably fixedly attached to the lid 24; however it is appreciated that the stopper members 26 may be removably attached to the lid 24, wherein the user may attach a respective stopper member 26 if utilizing the corresponding panel 40.

Each of the sidewalls 22a, 22b includes a plurality of grooves 32, 34 as illustrated in FIG. 1. The grooves 32, 34 collectively receive the panel 40 when attaching the panel 40 within the container 20. A first sidewall 22a further includes a plurality of first grooves 32 and a second sidewall 22b includes a plurality of second groove 34. The first grooves 32 and the second grooves 34 mirror each other, wherein the configuration of the first grooves 32 is preferably identical to the configuration of the second grooves 34.

The grooves 32, 34 extend from the opening 27 of the container 20 to the base 21 of the container 20 upon the sidewalls 22a, 22b. The grooves 32, 34 may extend at varying angles to efficiently receive various size panels 40. In the preferred embodiment, the length of the grooves 32, 34 are configured to receive either a plurality of small panels 40, a plurality of medium size panels 40 or a large panel 40. Lesser length grooves 32, 34 subsequently extend at a more vertical angle than the longer length grooves 32, 34. The small, medium and large panels 40 are preferably utilized to secure a respective plurality of small, medium or large size fishing lures 12 as illustrated in FIGS. 5 and 6.

The grooves 32, 34 preferably intersect with each other along each sidewall 22a, 22b to allow for multiple configurations of grooves 32, 34 to accommodate a small space. The grooves 32, 34 also preferably each extend at an upward angle so as to allow the user to more easily insert and remove the fishing lures 12 from the panel 40. The upper end of the grooves 32, 34 is also preferably positioned above the upper end of the end wall 23b including the second connecting portion 29 so as to prevent the end wall 23b from interfering with the user inserting the various panels 40 and/or fishing lures 12.

The container 20 also includes at least one compartment 30 to position a panel 40 and a respective plurality of fishing lures 12 within. When utilizing multiple panels 40, the container 20 subsequently preferably includes multiple compartments 30 as illustrated in FIGS. 5 and 6. It is appreciated thus that the number of compartments 30 formed corresponds with the number of panels 40 utilized.

It is also appreciated that the container 20 may include various supports to support the center of the panels 40 within the container 20 and prevent the panels 40 from sagging when the panels 40 are utilized to secure a plurality of fishing hooks 14. It is appreciated that the supports may be fixedly attached within the container 20 or removably attached and may be comprised of various configurations.

In the improved embodiment, each of the sidewalls 22a, 22b includes a plurality of equidistantly spaced-apart guides 36a, 36b for slidably receiving the lure holder 50. Each of the guides 36a, 36b includes a first member 37a, 37b, a second member 38a, 38b, and a slot 39a, 39b formed between thereof to receive the associated protrusion 52a, 52b. It is appreciated that various types and embodiments of guides 36a, 36b may be utilized.

C. Panel

FIGS. 1 Through 6

The panel 40 is utilized to secure the fishing lures 12 and is removably positioned within the container 20 as illustrated in FIG. 2. The panel 40 is also preferably comprised of a durable and substantially waterproof material, such as but not limited to plastic, wood or metal. In the preferred embodiment, the panel 40 is comprised of a rectangular shaped structure; however it is appreciated that the panel 40 may be comprised of various shapes and configurations rather than the preferred embodiment all which may be efficiently receives by the plurality of grooves 32, 34. The panel 40 is also preferably comprised of a substantially flat and thin configuration to efficiently slide within the grooves 32, 34 and occupy a minimal amount of space within the container 20.

The panels 40 may be comprised of various sizes to selectively be received within the various length grooves 32, 34 as illustrated in FIGS. 5 and 6. Each of the panels 40 includes an inner end 42 and an outer end 43 as illustrated in FIG. 2. When inserting the panels 40 within the grooves 32, 34 the inner end 42 is inserted first and extends toward the base 21 of the container 20. The outer end 43 is subsequently positioned adjacent the opening 27 of the container 20 and slightly under the upper edge of the sidewalls 22a, 22b so as not to interfere with the closing of the lid 24.

The panel 40 also extends at an upward angle with respect to the base 21 and further preferably defines an acute angle with respect to the base 21. The upward angle allows for a user to more easily insert and remove the fishing lures 12 from the panel 40. The angle of the panel 40 is also substantially similar to the angle of the grooves 32, 34.

Each panel 40 also includes a plurality of slots 47 extending within the outer end 43 of the panel 40 and toward the inner end 42. The slots 47 are preferably spaced equidistant from each other and are also spaced at a sufficient distance apart so as to be able to position a fishing lure 12 within each slot 47 and not interfere with an adjacent fishing lure 12. The width of the slots 47 is also large enough to receive the portion of the fishing lure 12 between the body of the fishing lure 12 and the tip of the hook 14 of the fishing lure 12 as illustrated in FIGS. 4 and 6.

The receiving edges 45 of the panel 40 (adjacent the outer end 43) are preferably rounded so as to more easily insert the fishing lures 12 within the slots 47. It is appreciated however that the receiving edges 45 may be comprised of various configurations, such as but not limited to angled or straight.

D. Lure Holder

FIGS. 8 Through 13

FIGS. 8 through 13 illustrate an improved embodiment of the lure holder 50 that is adapted to be vertically received by the container 20 and includes sidewalls 51a, 51b and a rear wall 53 to form an improved stable structure. The container 20 may be suited for holding multiple lure holders 50 or a single lure holder 50. Additionally, the lure holders 50 may be formed in various sized each of which is suited for holding more or less fishing lures 12 and/or larger or smaller fishing lures 12.

The lure holder 50 generally includes first and second sidewalls 51a, 51b that are each positioned adjacent to a first or second sidewall 22a, 22b of the container 20. The first and second sidewalls 51a, 51b each include a level bottom edge to parallel the base 21 and an angular top edge that angles upwardly from a rear of the first and second sidewalls 51a, 51b to a front of the first and second sidewalls 51a, 51b.

Each of the sidewalls 51a, 51b includes at least one protrusion 52a, 52b extending laterally outwardly from the respective first and second sidewalls 51a, 51b to be slidably received by the first and second slots 59 of the first and second guides 36a, 36b of the container 20 as illustrated in FIG. 8. It is appreciated that each of the sidewalls 51a, 51b may include two or more protrusions 52a, 52b, such as a protrusion 52a, 52b near the front and rear of each of the sidewalls 51a, 51b. The protrusions 52a, 52b are each preferably comprised of a straight structure and are vertically oriented.

The lure holder 50 also generally includes a rear wall 53 extending from the first sidewall 51a to the second sidewall 51b at the rear of the lure holder 50. The rear wall 53 generally forms a back-end of the inner space of the lure holder 50 below the panel 55 to contain items positioned underneath the panel 55 and also provide a separation between multiple lure holders 50.

The bottom edge of the rear wall 53 generally extends below the bottom edges of the first and second sidewalls 51a, 51b so that the bottom edge of the rear wall 53 completely separates the rear end of the lure holder 50 from the rest of the cavity 31 or interior of the container 20, wherein the bottom edge of the rear wall 53 rests upon the base 21. The bottom edge of the first and second sidewalls 51a, 51b is spaced slightly upwardly from the bottom edge of the rear wall 53. The base 21 may curve slightly upwards at the outer sides so that the bottom edge of the sidewalls 51a, 51b also mates with the base 21. The front of the lure holder 50 has a defined front opening 54 that allows for items to be stored underneath the panel 55 of the lure holder 50 as desired.

The lure holder 50 includes the upwardly angling panel 55 forming a top of the lure holder 50, wherein the panel 55 angles upwardly from a rear end to a front end. The panel 55 includes a plurality of slots 59 extending within from a front end toward a rear end of the panel 55, wherein the slots 59 define a plurality of fingers 56. Each of the fingers 56 include a rounded, curved, or angled receiving edge 57 at the front end of the panel 55 for assisting in guiding the fishing lures 12 within the slots 59.

Each of the fingers 56 also generally include a divider 58 that is centered between adjacent slots 59. The divider 58 is vertically oriented and extends below the finger 56 and panel 55 for providing a separation between neighboring hooks 14 to prevent entanglement of the hooks 14. The divider 58 follows an angle of the panel 55 from a front end to a rear end of the panel 55. Each of the slots 59, fingers 56, and dividers 58 are preferably equidistantly spaced along the panel 55 and between the first and second sidewalls 51a, 51b.

Figure 9:
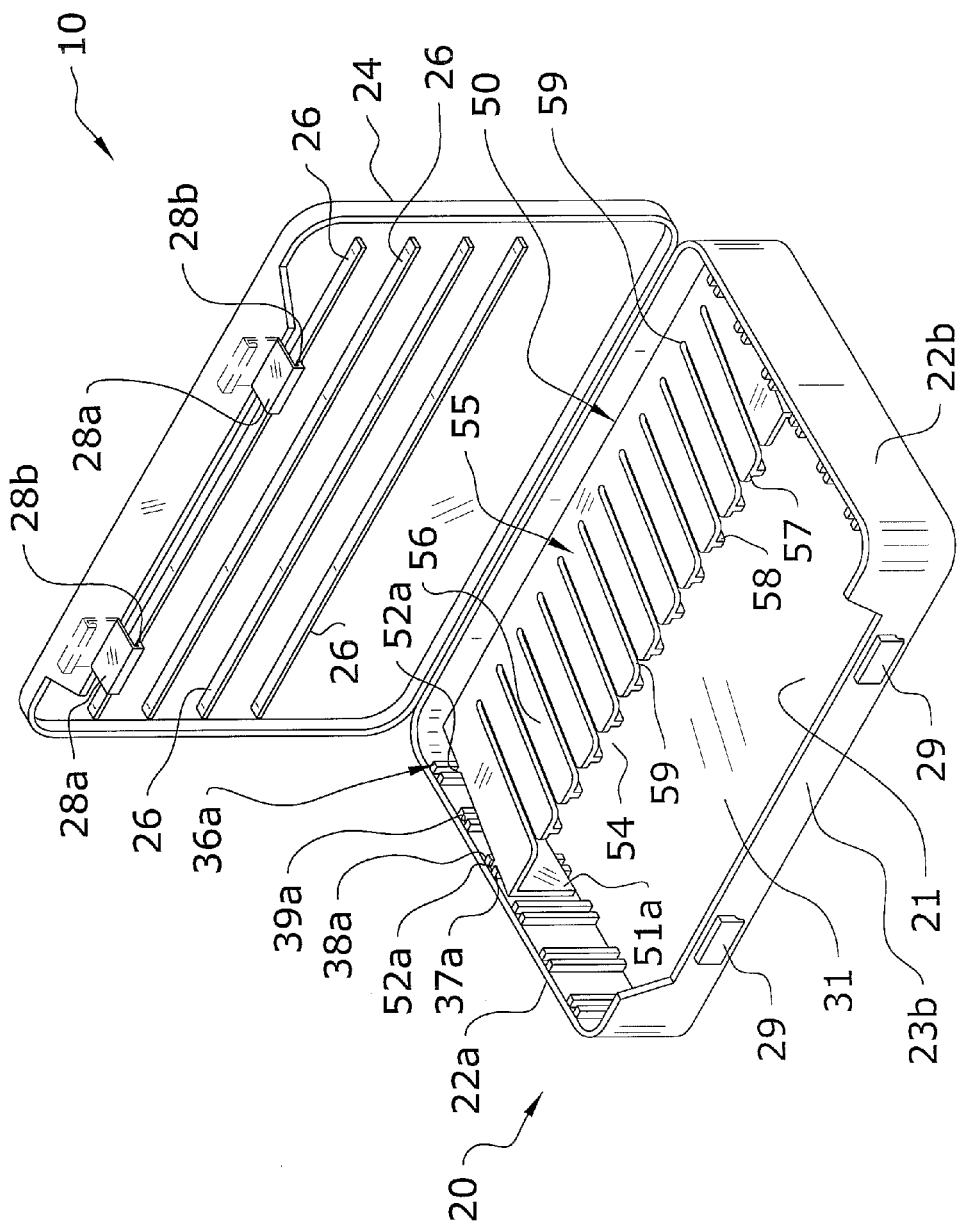
FIG. 9 is an upper perspective view of the improved present invention illustrating the lid in an open position and the lure holder secured within the container, wherein a medium-sized lure holder is illustrated.
Figure 10:
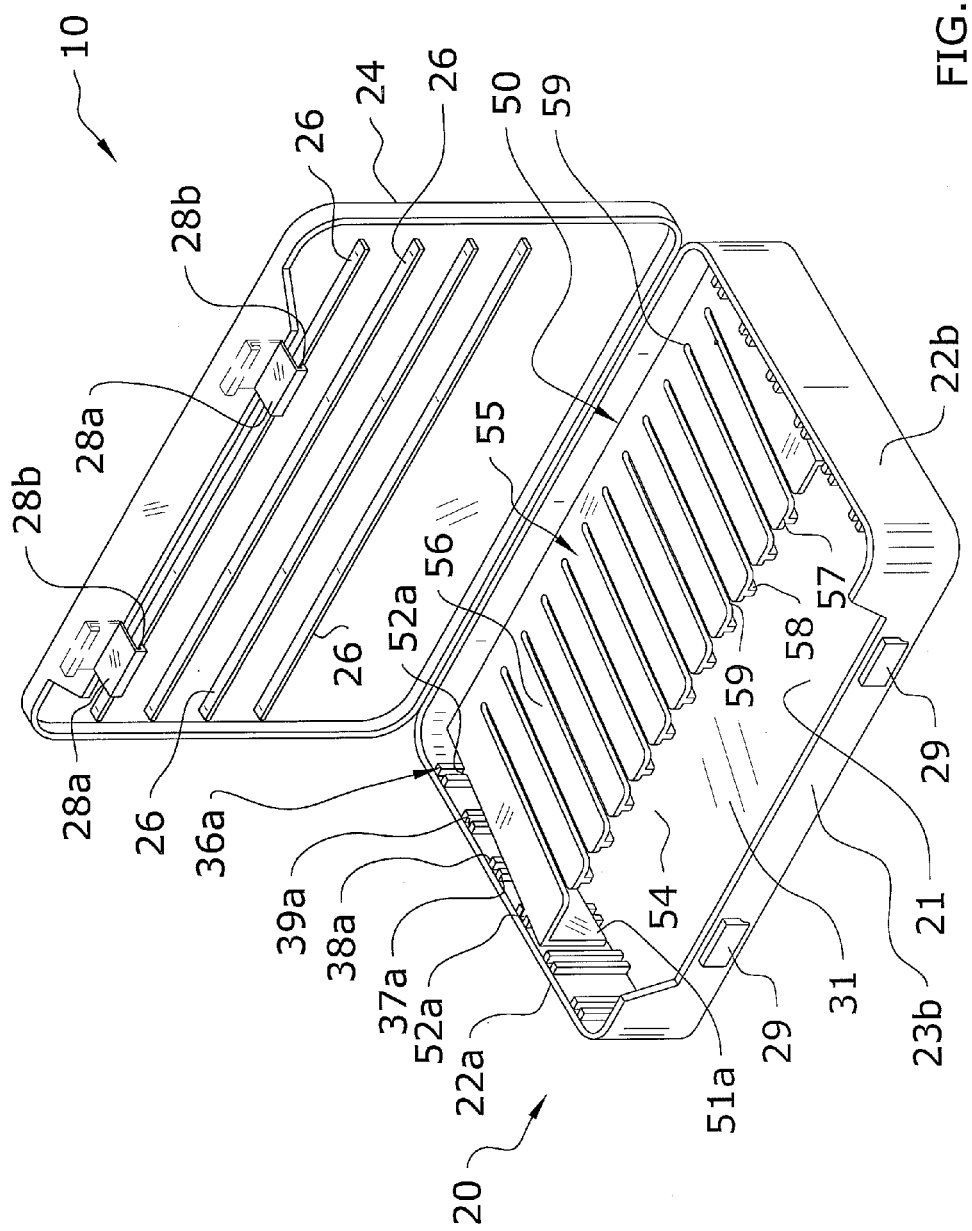
FIG. 10 is an upper perspective view of the improved present invention illustrating the lid in an open position and the lure holder secured within the container, wherein a large-sized lure holder is illustrated.
Figure 11:
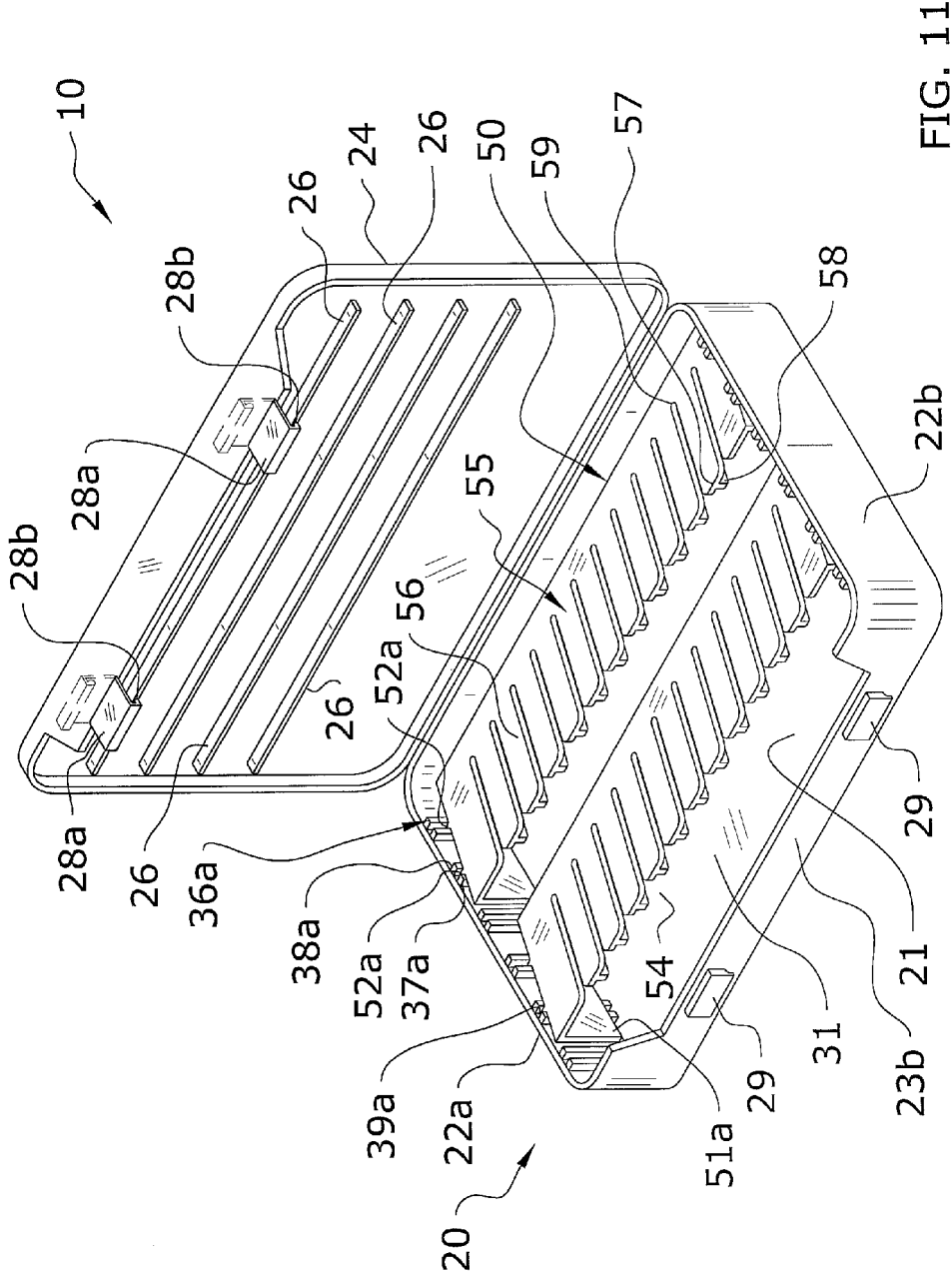
FIG. 11 is an upper perspective view of the improved present invention illustrating the lid in an open position and the lure holders secured within the container, wherein multiple small-sized lure holders are illustrated.
Figure 12:
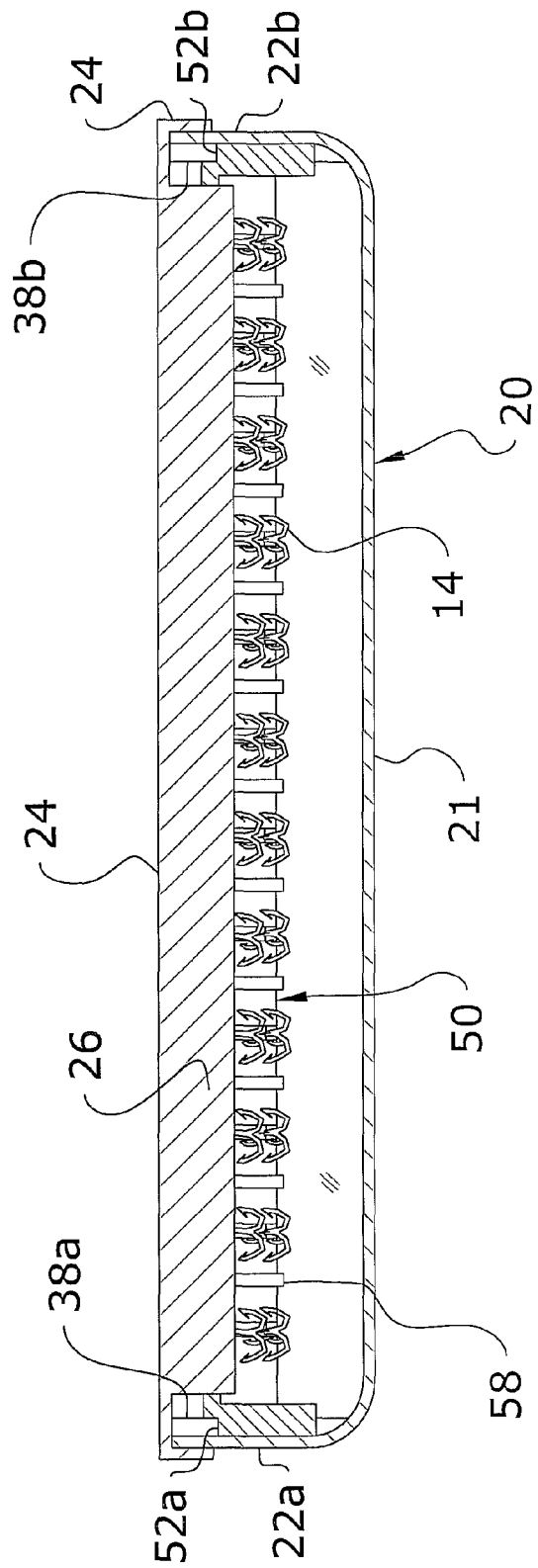
FIG. 12 is a front sectional view of the improved present invention.
Figure 13:
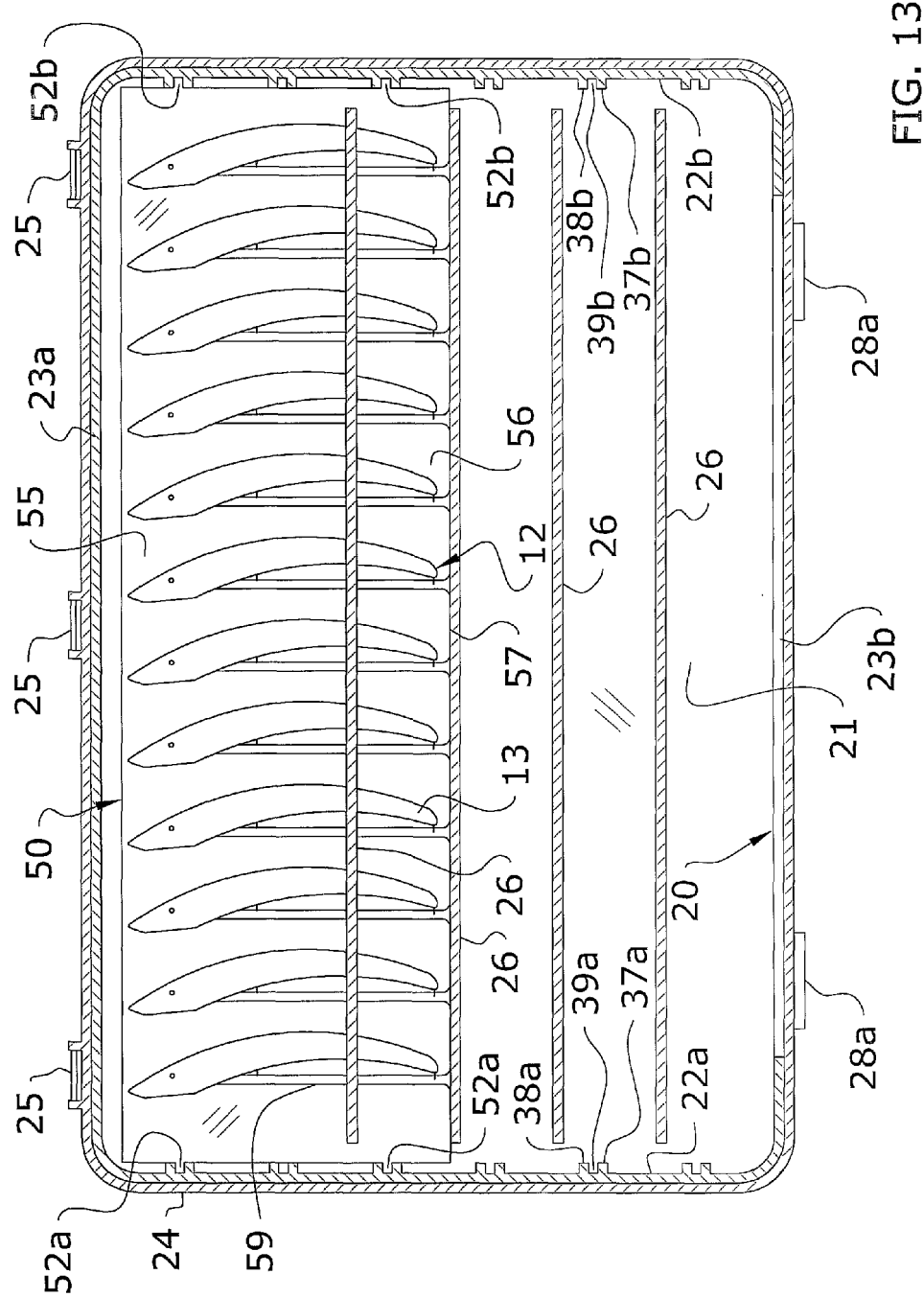
FIG. 13 is a top sectional view of the improved present invention.

As stated, the lure holders 50 may be formed in different sizes. The lure holders 50 may be formed in small, medium, large and various other sizes. FIG. 11 illustrates multiple small-sized lure holders 50 secured within the container 20. The lure holder 50 illustrated in FIG. 11 has sidewalls 51a, 51b that span across two and only two of the first guides 36a and second guides 36b. FIGS. 8 and 9 illustrate a medium-sized lure holders 50 secured within the container 20. The lure holder 50 illustrated in FIGS. 8 and 9 have sidewalls 51a, 51b that span across three and only three of the first guides 36a and second guides 36b. FIG. 10 illustrates a large-sized lure holders 50 secured within the container 20. The lure holder 50 illustrated in FIG. 10 has sidewalls 51a, 51b that span across four and only four of the first guides 36a and second guides 36b. It is appreciated that the sizes of the lure holders 50 may vary as well as the size of the container 20 and the number of first and second guides 36a, 36b.

In the exemplary views, the length of the slot 59 is different in each of the small, medium, and large-sized lure holders 50, wherein the large-sized lure holder 50 illustrated in FIG. 10 has the longest slots 59 for holding the largest and the most fishing lures. Likewise, the medium-sized lure holder 50 has longer slots 59 than the small-sized lure holder 50. Each of the slots 59 in a respective lure holder 50 are preferably similar in length as illustrated.

E. Operation of Preferred Embodiment

In use, the lid 24 of the container 20 is first opened and depending upon what size fishing lures 12 are to be utilized and how many fishing lures 12 the appropriate sized lure holder 50 is inserted within the cavity 31 of the container 20. The lure holder 50 is inserted by aligning the protrusions 52a, 52b on each side of the lure holder 50 with the slots 39a, 39b of the guides 36a, 36b on each sidewall 22a, 22b of the container 20 and then vertically extending the lure holder 50 downward so that the protrusions 52a, 52b are slidably received by the slots 39a, 39b and the bottom edges of the lure holder 50 engage the base 21 of the container 20.

Once the lure holder(s) 50 is secured within the slots 39a, 39b, the fishing lures 12 may be inserted within each of the desired slots 59 guiding the fishing lure 12 so that the body 13 of the fishing lure 12 is positioned above the panel 55 and the hook(s) 14 of the fishing lure 12 is positioned below the panel 55 thus preventing entanglement of the hooks 14 and preventing accidental engagement of the hooks 14 with the user when removing the hooks 14 from the lure holder 50.

The lid 24 may now be closed and latched shut. As the lid 24 is shut, the stopper members 26 are positioned in front of the slots 59 to prevent the fishing lure 12 from unintentionally sliding out of the slots 59 of the lure holder 50. When it is desired to utilize a fishing lure 12 the lid 24 is simply opened and a desired fishing lure 12 may be removed from a respective slot 59.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

The invention claimed is:

1. An adjustable fishing tackle box, comprising:
   a container having a base, a first sidewall, and a second sidewall, wherein said first sidewall is opposite said second sidewall with respect to said base and wherein said first sidewall and said second sidewall define a cavity, wherein said container includes a rear wall and a front wall;
   a lid movably connected to said rear wall of said container to close over said cavity, wherein said lid includes a first side and a second side;
   at least one first guide vertically oriented along an interior of said first sidewall;
   at least one second guide vertically oriented along an interior of said second sidewall, wherein said at least one second guide is aligned with said at least one first guide;
   at least one lure holder having a first sidewall, a second sidewall opposite said first sidewall and a panel extending from said first sidewall to said second sidewall;
   wherein said panel includes a plurality of slots spaced apart along said panel, wherein each of said plurality of slots is for receiving at least one fishing lure with a hook of a fishing lure positioned below the said panel and a body of a fishing lure positioned above said panel;
   at least one first protrusion extending laterally outward from said first sidewall of said at least one lure holder;
   at least one second protrusion extending laterally outward from said second sidewall of said at least one lure holder;
   wherein said at least one first protrusion and said at least one second protrusion are collectively received by said at least one first guide and said at least one second guide to secure said at least one lure holder within said cavity of said container; and
   a plurality of stopper members extending perpendicularly downward from said lid, each of said plurality of stopper members being comprised of elongated members extending across said lid from said first side to said second side, each of said plurality of stopper members being adapted to extend over said plurality of slots to prevent said fishing lure from sliding out of any of said plurality of slots when said lid is closed, wherein each of said plurality of stoppers extends perpendicularly with respect to said plurality of slots of said panel.

2. The adjustable fishing tackle box of claim 1, wherein said panel angles upwardly from a rear end to a front end of said panel.

3. The adjustable fishing tackle box of claim 1, wherein said panel includes a plurality of dividers centered between each of said plurality of slots.

4. The adjustable fishing tackle box of claim 3, wherein each said plurality of dividers is vertically oriented.

5. The adjustable fishing tackle box of claim 4, wherein each said plurality of dividers extend below said panel.

6. The adjustable fishing tackle box of claim 1, wherein said at least one lure holder has a rear wall and an open front.

7. The adjustable fishing tackle box of claim 1, wherein said at least one first guide includes a plurality of first guides and wherein said at least one second guide includes a plurality of second guides.

8. The adjustable fishing tackle box of claim 7, wherein said plurality of first guides are equidistantly spaced apart and wherein said plurality of second guides are equidistantly spaced apart.

9. The adjustable fishing tackle box of claim 1, including said closable lid attached to said container for sealing said cavity and extending over said at least one lure holder.

10. The adjustable fishing tackle box of claim 1, wherein said at least one first guide and said at least one second guide each have a vertically oriented first member and a spaced apart vertically oriented second member to define a slot between said first member and said second member for collecting receiving said at least one first protrusion and said at least one second protrusion.

11. An adjustable fishing tackle box, comprising:
- a container having a base, a first sidewall, and a second sidewall, wherein said first sidewall is opposite said second sidewall with respect to said base and wherein said first sidewall and said second sidewall define a cavity, wherein said container includes a rear wall and a front wall;
- a lid movably connected to said rear wall of said container to close over said cavity;
- a plurality of first guide slots vertically oriented along an interior of said first sidewall, wherein said plurality of first guide slots are spaced apart in an equidistant manner from a front end to a rear end of said first sidewall;
- a plurality of second guide slots vertically oriented along an interior of said second sidewall, wherein said plurality of second guide slots are spaced apart in an equidistant manner from a front end to a rear end of said second sidewall;
- wherein said plurality of first guide slots are aligned with said plurality of second guide slots;
- at least one lure holder having a first sidewall, a second sidewall opposite said first sidewall and a panel extending from said first sidewall to said second sidewall;
- wherein said panel includes a plurality of slots spaced apart along said panel, wherein each of said plurality of slots is for receiving at least one fishing lure with a hook of a fishing lure positioned below the said panel and a body of a fishing lure positioned above said panel;
- at least one first protrusion extending laterally outward from said first sidewall of said at least one lure holder;
- at least one second protrusion extending laterally outward from said second sidewall of said at least one lure holder;
- wherein said at least one first protrusion and said at least one second protrusion are collectively received by said at least one of said plurality of first guide slots and said at least one of said plurality of second guide slots to secure said at least one lure holder within said cavity of said container; and
- a first stopper member attached to said lid in spaced-apart relationship with a front edge of said lid, wherein said first stopper member extends perpendicularly downward from said lid, wherein said first stopper member is comprised of an elongated member extending across said lid in a direction perpendicular with respect to said plurality of slots of said panel, wherein said first stopper member is adapted to extend over said plurality of slots to prevent said fishing lure from sliding out of any of said plurality of slots when said lid is closed;
- a second stopper member attached to said lid in spaced-apart relationship with said first stopper member, wherein said second stopper member extends perpendicularly downward from said lid, wherein said second stopper member is comprised of an elongated member extending across said lid in a direction perpendicular with respect to said plurality of slots of said panel, wherein said second stopper member is adapted to extend over said plurality of slots to prevent said fishing lure from sliding out of any of said plurality of slots when said lid is closed.

12. The adjustable fishing tackle box of claim 11, wherein said panel angles upwardly from a rear end to a front end of said panel.

13. The adjustable fishing tackle box of claim 11, wherein said panel includes a plurality of dividers centered between each of said plurality of slots.

14. The adjustable fishing tackle box of claim 13, wherein each said plurality of dividers is vertically oriented.

15. The adjustable fishing tackle box of claim 14, wherein each said plurality of dividers extend below said panel.

16. The adjustable fishing tackle box of claim 11, wherein said at least one lure holder has a rear wall and an open front.

17. The adjustable fishing tackle box of claim 11, including said closable lid attached to said container for sealing said cavity and extending over said at least one lure holder.

18. An adjustable fishing tackle box, comprising:
- a container having a base, a first sidewall, and a second sidewall, wherein said first sidewall is opposite said second sidewall with respect to said base;
- wherein said container includes a rear wall and a front wall;
- wherein said first sidewall, said second sidewall, said rear wall, and said front wall define a cavity;
- a plurality of first guides vertically oriented along an interior of said first sidewall, wherein said plurality of first guides are spaced apart in an equidistant manner from a front end to a rear end of said first sidewall;
- wherein said plurality of first guides each include a first vertical member extending inwardly from said first sidewall, a second vertical member extending inwardly from said first sidewall, and a first vertical guide slot defined by said first member and said second member of said first guide;
- a plurality of second guides vertically oriented along an interior of said second sidewall, wherein said plurality of second guides are spaced apart in an equidistant manner from a front end to a rear end of said second sidewall;
- wherein said plurality of second guides each include a first vertical member extending inwardly from said second sidewall, a second vertical member extending inwardly from said second sidewall, and a second vertical guide slot defined by said first member and said second member of said second guide;
- wherein said plurality of first guides are aligned with said plurality of second guides;
- a lid movably connected to said rear wall of said container to close over said cavity, wherein said lid includes a latching mechanism for securing to said front wall of said container;
- at least one lure holder having a first sidewall, a second sidewall opposite said first sidewall and a panel extending from said first sidewall to said second sidewall;
- wherein said panel angles upwardly from a rear end to a front end of said panel;

wherein said panel includes a plurality of slots spaced apart along said panel, wherein each of said plurality of slots is for receiving at least one fishing lure with a hook of a fishing lure positioned below the said panel and a body of a fishing lure positioned above said panel;

wherein said panel includes a plurality of dividers centered between each of said plurality of slots;

wherein each said plurality of dividers is vertically oriented and wherein each said plurality of dividers extend below said panel;

wherein said at least one lure holder has a rear wall and an open front;

wherein a bottom edge of said rear wall extends below a first bottom edge of said first sidewall of said at least one lure holder and a second bottom edge of said second sidewall of said at least one lure holder;

at least two first protrusions extending laterally outward from said first sidewall of said at least one lure holder;

at least two second protrusions extending laterally outward from said second sidewall of said at least one lure holder;

wherein said at least two first protrusions and said at least two second protrusions are collectively received by at least one two first guide slots of said plurality of first guides and by at least one two second guide slots of said plurality of second guides to secure said at least one lure holder within said cavity of said container;

a first stopper member removably attached to said lid in spaced-apart relationship with a front edge of said lid, wherein said first stopper member extends perpendicularly downward from said lid, wherein said first stopper member is comprised of an elongated member extending across said lid in a direction perpendicular with respect to said plurality of slots of said panel, wherein said first stopper member is adapted to extend over said plurality of slots to prevent said fishing lure from sliding out of any of said plurality of slots when said lid is closed;

a second stopper member removably attached to said lid in spaced-apart relationship with said first stopper member, wherein said second stopper member extends perpendicularly downward from said lid, wherein said second stopper member is comprised of an elongated member extending across said lid in a direction perpendicular with respect to said plurality of slots of said panel, wherein said second stopper member is adapted to extend over said plurality of slots to prevent said fishing lure from sliding out of any of said plurality of slots when said lid is closed; and a third stopper member removably attached to said lid in spaced-apart relationship with said second stopper member, wherein said third stopper member extends perpendicularly downward from said lid, wherein said third stopper member is comprised of an elongated member extending across said lid in a direction perpendicular with respect to said plurality of slots of said panel, wherein said third stopper member is adapted to extend over said plurality of slots to prevent said fishing lure from sliding out of any of said plurality of slots when said lid is closed.

* * * * *